(No Model.)

E. L. SHULTZ.
GEARING FOR BICYCLES.

No. 518,970. Patented May 1, 1894.

Witnesses:
John L. Edwards Jr.
Fred. J. Dole.

Inventor:
Edward L. Shultz.
By his Attorney.
J. H. Richards

UNITED STATES PATENT OFFICE.

EDWARD L. SHULTZ, OF SPRINGFIELD, MASSACHUSETTS.

GEARING FOR BICYCLES.

SPECIFICATION forming part of Letters Patent No. 518,970, dated May 1, 1894.

Application filed March 25, 1893. Serial No. 467,618. (No model.)

*To all whom it may concern:*

Be it known that I, EDWARD L. SHULTZ, a citizen of Warsaw, Poland, residing at Springfield, in the county of Hampden and State of Massachusetts, have invented certain new and useful Improvements in Gearing for Bicycles, of which the following is a specification.

This invention relates to geared bicycles, the object being to furnish improved gearing whereby one of the wheels of a bicycle of the so-called "safety" class may be positively actuated from the treadle-shaft through a connecting shaft and gearing.

Figure 1:
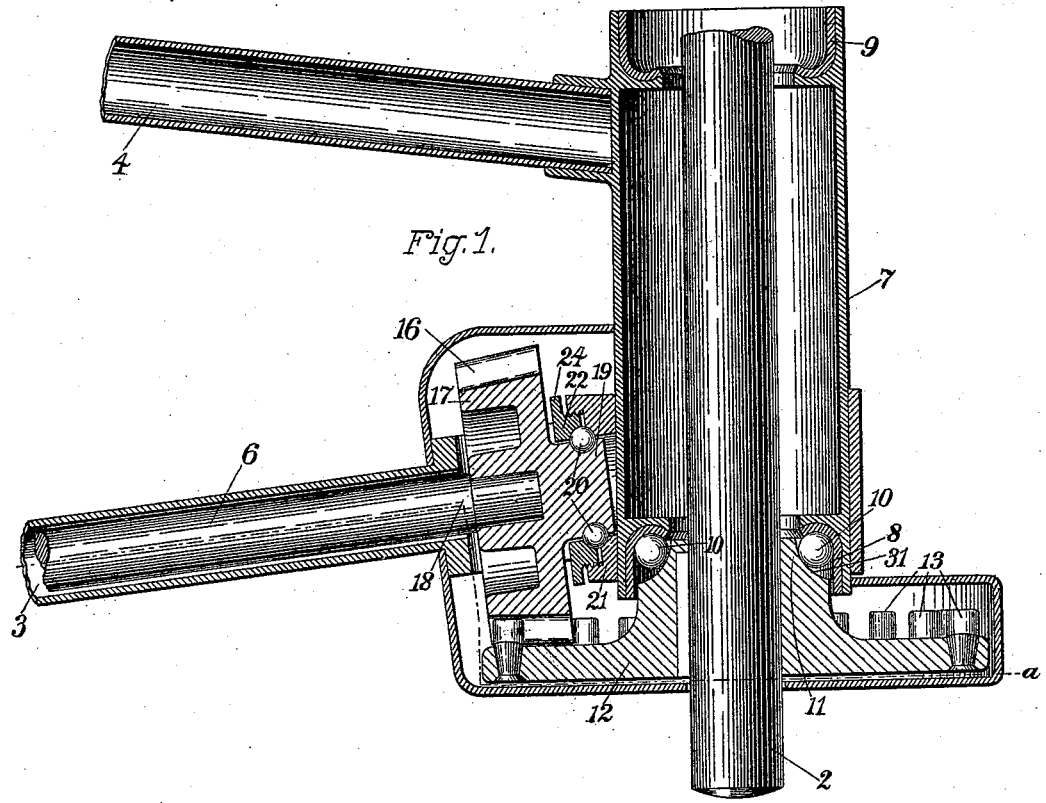
Figure 2:
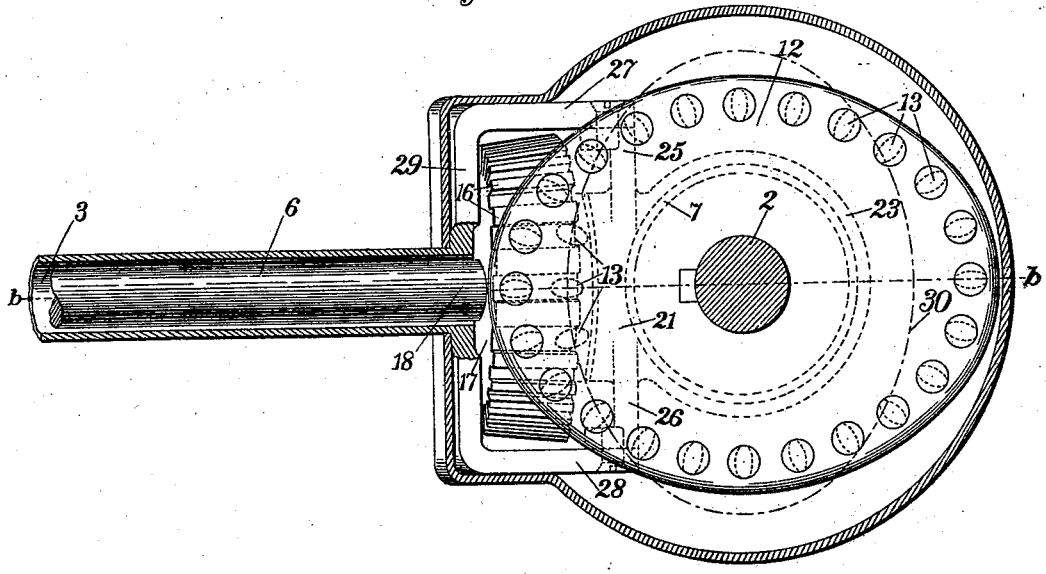

In the drawings accompanying and forming a part of this specification, Figure 1, is a sectional plan view of a portion of the framework of a bicycle of the class specified, furnished with my present improvements. Fig. 2 is a sectional side elevation of the same, on line *a—a* as seen from below in Fig. 1. Fig. 1 may be considered as a section in line *b b* Fig. 2.

Similar characters designate like parts in all the figures.
My present improvements are applicable to the gearing for connecting the usual pedal-shaft 2 with the side-shaft, or intermediate shaft, 6; of the bicycle.

The application of ordinary bevel-gearing and connecting shafts to the driving of bicycles of the safety class, and as a substitute for the more usual chain and sprocket wheels, being old and well known, I have deemed it sufficient to illustrate in the drawings of my present application only those parts of the framework of the bicycle which immediately connect with, or relate to, my present invention. In Figs. 1 and 2, therefore, I have shown only that part of the framework which carries the bearings for the usual crank or pedal-shaft 2, including portions of the usual side-tubes or rods 3 and 4, which extend, respectively to the opposite ends of the driving-wheel shaft not shown.
In my present improvements shown in the drawings, in which my invention is shown adapted for use as pedal-gearing, the pin-tooth gear is the driving-gear. In this pedal-gearing, the pedal-shaft 2, is revolubly supported in the head portion 7, of the framework of the bicycle, which portion is shown provided at the opposite ends thereof with the ball-track bushings 8 and 9, in one of which are shown the usual balls, 10, of the ball-bearing; these balls bear against the ball-track 31, of the hub 11, of the pedal-gear 12. Said pedal-gear is shown provided with a series of pin-teeth 13, which may, as herein shown, consist of separate pins inserted into the disk of the pedal-gear, or may, if preferred, be formed integral therewith. The pedal gear teeth 13, mesh with the teeth 16, of a driven-gear 17. Said gear 17, is shown fixed to the forward end 18, of the aforesaid side-shaft 6. On its forward side said driven-wheel is shown having a projecting hub or journal 19, grooved for receiving the balls 20, which run within a track formed between a suitably-shaped portion 21, of the framework and a ring-bearing 22, screwed into said frame-portion 21, as will be understood from Fig. 1. By means of the flange 24, of said ring-bearing 22, this bearing may be screwed more or less into the frame-portion 21, for the purpose of adjusting the fit of the balls between said tracks. The frame-portion 21, here referred to is, or may be, in the nature of a bearing-block (shown by dotted lines in Fig. 2), which block is shown held in place by means of its band 23, that extends around the aforesaid frame-tube 7, as indicated by dotted lines in Fig. 2. Said bearing-block 21, is shown provided with the upwardly and downwardly-extending arms 25 and 26, respectively, to which are fastened the ends, 27 and 28, respectively, of the yoke 29; which yoke is fixed to the forward end of the aforesaid frame-tube 3, (in which is contained the side-shaft 6,) and, by extending over the gear as shown, connects together the described parts of the bicycle-framework. The gear 17 on the side-shaft 6, has its teeth of so-called "ribbed form" and approximately longitudinally of said side-shaft, with spaces between the teeth after the manner common to spur-gearing of the same general class. The opposite gear consists, of a disk, as 12, in position adjacent to the face of the opposite ribbed-toothed gear, so that the pin-formed teeth of said gear-disk mesh properly with the ribbed teeth of said side-shaft gear, as will be understood from the several figures of drawings.

An important further feature of my invention is illustrated in Figs. 1 and 2, and consists in a combination of gears in which one of them is elliptical or oblong, as illustrated, for instance, in Fig. 2, where the oblong driving-gear 12, is shown with the long-radius teeth at one end thereof engaging in the driven-gear 17, at which time the driving-gear is imparting the greatest velocity to the driven-gear, and consequently, through the side-shaft and the drive-wheel gearing, to the bicycle itself. As the driving-wheel 12, revolves to its quarter-position shown by the dotted line 30, (representing the centers of the series of teeth 13,) the rotary movement of the pedal-shaft and the said driving-gear is, relatively faster as compared with the movement of said driven-gear 17, and consequently the bicycle will be driven at a correspondingly slower speed relatively to the movement of the pedal-shaft itself. In practice, however, the driving-gear 12, and not the bicycle, will, owing to the natural action of the rider in treading the pedals, be subjected to the varying rate of movement. The effect of this is, in practice, to reduce the speed of the pedals relatively to the speed of the machine during the mid-stroke portion of their rising or descending movement, and to accelerate the rotary movement of the pedals as these approach the dead-centers of their movement,—that is, in usual practice, the upper and lower points in their path of movement.

My present improvements, as described in connection with Figs. 1 and 2, have the advantages obtained in chain-driven bicycles by the use of the elliptical sprocket-wheel, in addition to the advantages of the geared bicycle over the chain-driven bicycle.

Having thus described my invention, I claim—

1. In a bicycle, the combination in the drive-gearing thereof, of two shafts located in crosswise positions, and a pair of gears, one on each shaft respectively, one of which gears is oblong, whereby the shafts are driven with varying relative velocities, substantially as set forth.

2. In a bicycle, the combination in the driving-gearing thereof, of the pedal-shaft, the intermediate shaft, the gear on the intermediate shaft, and an oblong gear on the pedal-shaft, whereby the pedal-shaft has varying velocities relatively to the side-shaft, substantially as set forth.

EDWARD L. SHULTZ.

Witnesses:
 HENRY H. BOSWORTH,
 CLARA F. BUSHEE.